(12) United States Patent
Romenesko

(10) Patent No.: US 7,433,216 B2
(45) Date of Patent: Oct. 7, 2008

(54) VOLTAGE CONTROL AND HARMONIC MINIMIZATION OF MULTI-LEVEL CONVERTER

(75) Inventor: Charles J. Romenesko, Roscoe, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 139 days.

(21) Appl. No.: 11/273,507

(22) Filed: Nov. 14, 2005

(65) Prior Publication Data

US 2007/0109824 A1    May 17, 2007

(51) Int. Cl.
*H02M 7/5387*  (2007.01)
(52) U.S. Cl. ......................................... 363/132; 363/41
(58) Field of Classification Search ............. 363/39–44, 363/58, 59, 129, 132, 136, 56, 98, 95, 71, 363/97, 137; 323/271, 212, 213, 235, 205, 323/207; 318/800–802
See application file for complete search history.

(56) References Cited

U.S. PATENT DOCUMENTS

| | | | |
|---|---|---|---|
| 4,344,123 A | 8/1982 | Bhagwat et al. | |
| 4,977,492 A | 12/1990 | Kirchberg, Jr. et al. | |
| 5,055,992 A | 10/1991 | Cook | |
| 5,212,629 A | 5/1993 | Jessee | |
| 5,327,335 A | 7/1994 | Maddali et al. | |
| 5,383,107 A * | 1/1995 | Hopkins et al. | 363/41 |
| 5,526,252 A * | 6/1996 | Erdman | 363/41 |
| 5,642,275 A * | 6/1997 | Peng et al. | 363/137 |
| 5,831,843 A | 11/1998 | Lindberg et al. | |
| 5,936,855 A | 8/1999 | Salmon | |
| 5,956,243 A | 9/1999 | Mao | |
| 6,075,350 A * | 6/2000 | Peng | 323/207 |
| 6,088,245 A * | 7/2000 | Ainsworth | 363/39 |
| 6,459,596 B1 | 10/2002 | Corzine | |
| 6,594,164 B2 | 7/2003 | Suzuki | |
| 6,728,120 B1 | 4/2004 | Greif et al. | |
| 2002/0048181 A1 | 4/2002 | Kobayashi et al. | |
| 2003/0117815 A1 | 6/2003 | Saada | |

* cited by examiner

*Primary Examiner*—Rajnikant B Patel
(74) *Attorney, Agent, or Firm*—Kinney & Lange, P.A.

(57) ABSTRACT

A controller applies a pattern of pulses to switching elements within a multi-level controller to effectuate control of the fundamental voltage magnitude and phase associated with the converter, as well as providing harmonic minimization of the $5^{th}$ and $7^{th}$ level harmonics. The controller combines a first pattern of pulses with a second pattern of pulses phase shifted by an amount based on the desired fundamental voltage magnitude to create a third pattern of pulses. The controller applies a phase shift to the third pattern of pulses based on the desired fundamental voltage phase. The controller supplies switching control waveforms to active components within the multi-level controller based on the phase shifted third pattern of pulses such that the desired fundamental voltage magnitude and phase is generated and selected harmonics are minimized.

18 Claims, 4 Drawing Sheets

VOLTAGE CONTROL AND HARMONIC MINIMIZATION OF MULTI-LEVEL CONVERTER

BACKGROUND OF THE INVENTION

Commonly used in power generation systems, converters are devices that either convert an alternating current (AC) signal into a direct current (DC) signal (rectifier), or a DC signal to an AC signal (inverter). Whether a converter is being used as a rectifier or an inverter is dependent on the direction power is flowing through the converter. A typical power generation system may include a generator for producing an AC signal, an AC-DC converter (or rectifier), a DC link, a DC-AC converter (or inverter), and a load. The AC signal generated by the generator is provided to the AC-DC rectifier, which provides a rectified signal to the DC link. Active control of the AC-DC rectifier helps maintain a constant DC output voltage. Furthermore, the DC link can include capacitive elements or filters that also help maintain a constant DC voltage level at the DC link. The DC link provides DC voltage to the load, which may be a DC-AC inverter or other DC load.

In the case of rectifiers, the simplest and least expensive type of rectifier uses a full- or half-bridge of diodes to convert single- or multi-phase AC input power into DC power. However, diode rectifiers act as a non-linear load, only conducting or distributing current when the voltage across the respective diodes is positive. Passive rectification of an AC signal results in the generation of harmonics at some multiple of the fundamental frequency of the AC signal; wherein different multiples of the fundamental frequency have different amplitudes. Only current associated with the fundamental waveform produces real power, whereas, harmonic waveforms always represent a loss to the AC generator or the system as a whole. In particular, for passive rectifiers, generation of $5^{th}$ and $7^{th}$ level harmonics are particularly expensive in terms of power loss. Therefore, it would be beneficial to minimize the generation of $5^{th}$ and $7^{th}$ level harmonics by rectifiers. Similar harmonics are created in inverters at some multiple of the fundamental frequency being generated.

Employing active switching devices within a rectifier allows harmonic distortion to be minimized. Passive rectification provides a limited DC output voltage magnitude. By employing active switching devices in a rectifier, the DC output voltage can be boosted beyond the passively rectified DC output voltage and can also be controlled at a desired magnitude. Typically, it is desirable to maintain the output voltage of a rectifier at a predetermined set point voltage. Employing active components within the rectifier allows a controller to affect the input voltage of the rectifier, and therefore allows the DC output voltage of the rectifier to be controlled. This allows the controller to maintain the DC output voltage of the rectifier at a particular DC magnitude.

In order to limit the $5^{th}$ and $7^{th}$ level harmonics, each active switching device within the active rectifier must be turned on and off (defined as a switching event) at least five times. With five switching events, the input voltage being generated at the input to the rectifier (or output of an inverter) is always maximized, preventing any control of the input voltage and therefore any control of the DC output voltage. In order to selectively control the input voltage (and therefore the DC output voltage), at least seven switching events are required. Solving complicated transcendental equations is required to determine the pulse width of each switching event in order to control the DC output voltage to a desired level, making real time control of the DC output voltage difficult.

Furthermore, as active rectifiers are introduced into systems having increasing power levels, the high power switching devices required to handle high power currents and voltages incur high switching losses. Therefore, systems that use a large number of switching events to reduce harmonic distortion or effectuate output voltage control incur high switching losses. A number of complicated switching schemes have been introduced to minimize the high switching losses, such as soft switching schemes (e.g., zero voltage switching or zero current switching) or interleaved approaches that make use of many smaller rated devices. However, these schemes require complex calculations that also make real time control of the output voltage difficult to maintain.

Reducing the number of switching events in order to avoid the associated high switching costs typically results in a significant increase in lower order harmonics (specifically the high energy $5^{th}$ and $7^{th}$ level harmonics), resulting in an increase of rotor losses in the generator. Large (and therefore expensive) filtering components would be required if lower order harmonics cannot be removed. Therefore, a tradeoff exists between the switching losses associated with minimizing harmonics and facilitating control of the DC output voltage, and the cost of employing filters to remove the harmonic distortion.

In addition, as power levels and voltage levels processed by a rectifier increases, the voltage ratings of the switching devices must also increase. When higher voltage rating devices are not available, it is common to employ a multi-level inverter/rectifier topology that divides the voltage among several switching devices and diodes. The multilevel inverter/rectifier, which requires more active switching components, increases the complexity of switching schemes used to reduce harmonic distortion. While the above discussion focused on rectifiers, the same issues and problems exist for invertors, because the only difference between the two is the direction of power. It is also desirable in inverter applications for a controller to be able to minimize harmonics while facilitating AC output voltage control (magnitude and phase).

Therefore, it would be useful to develop a system and method of converting (rectifying/inverting) high voltage, high power signals without incurring high switching costs while minimizing low order harmonics without the need for large expensive filters. The system and method must also be capable of being performed in real-time, allowing the output voltage to be controlled as desired.

BRIEF SUMMARY OF THE INVENTION

The present invention relates to a system and method for controlling the fundamental voltage of a multi-level converter, while minimizing the generation of harmonics. In particular, the present invention includes a controller that determines a desired fundamental voltage magnitude. The controller combines a first pattern of pulses with a second pattern based on the desired fundamental voltage magnitude to generate a third pattern of pulses. The controller delivers voltage waveforms to active components within the active controller based on the third pattern of pulses, such that application of the voltage waveforms results in the desired fundamental voltage magnitude and phase being generated.

DETAILED DESCRIPTION

Figure 1:
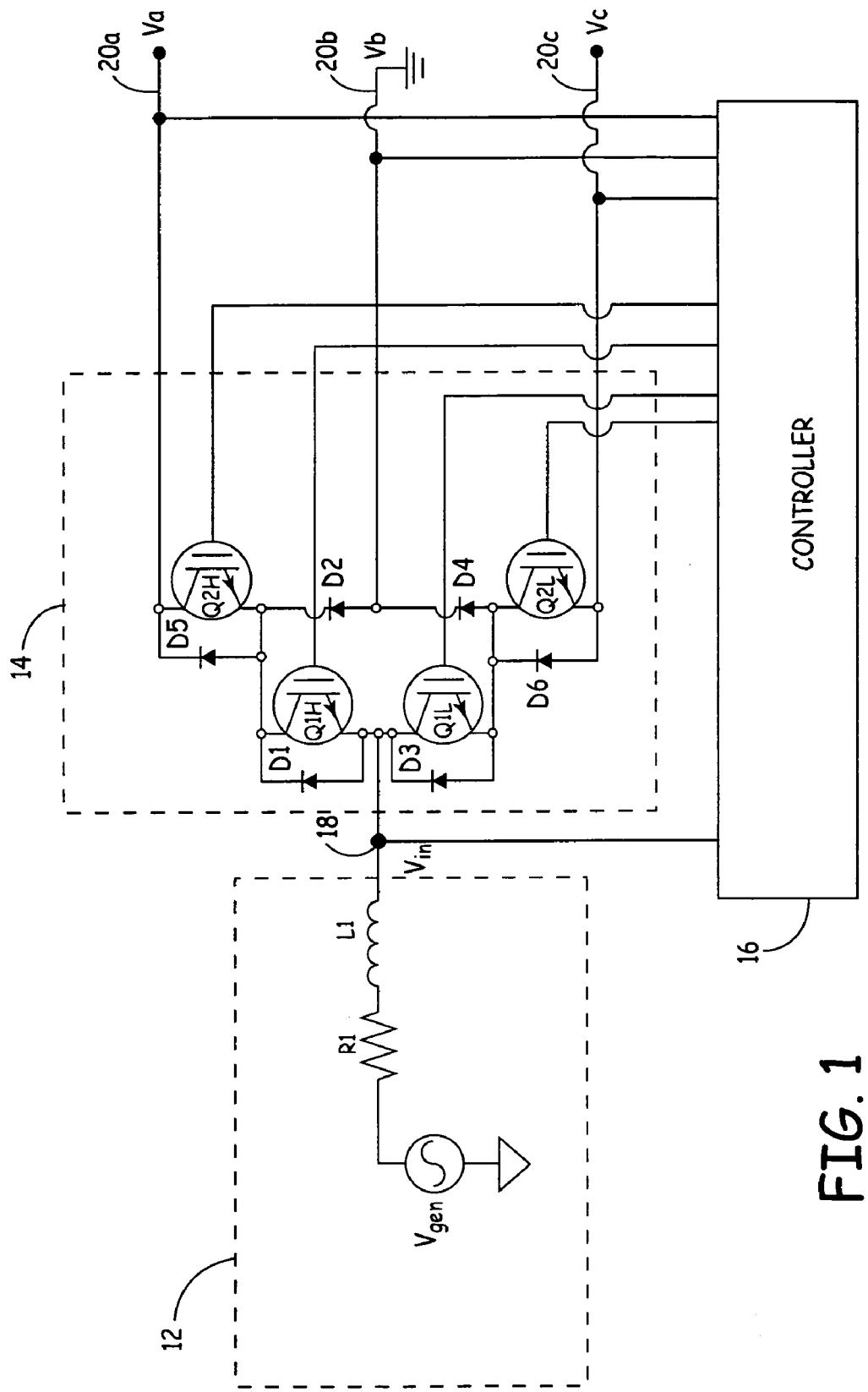
FIG. 1 is a circuit diagram of a three-level converter and controller of the present invention.

FIG. 1 shows a circuit diagram of generator/motor 12, three-level converter 14, and controller 16. To simplify the remainder of the description, the present invention is described in terms of three-level converter 14 operating as a rectifier. If three-level converter 14 operates as a rectifier, then node 18 can be described as input voltage $V_{in}$, and terminals 20a, 20b, and 20c can be described as DC output voltage Va, Vb, and Vc (in the case of an inverter, node 18 represents the output voltage, and terminals 20a, 20b, and 20c would act as the DC input). If three-level converter 14 were operating as an inverter (converting DC power to AC power) then generator/motor 12 would be treated as a motor. Therefore, throughout this description, generator/motor 12 will be described as generator 12. As discussed above, the direction power flows through converter 14 dictates whether three-level converter 14 operates as a rectifier or inverter. To further simplify the description, only the components necessary to rectify a single phase generated by generator 12 are described. Multiple phase AC input rectification can be achieved by adding an additional three-level rectifier, connected in parallel, with respect to each additional phase.

Generator 12, which typically includes a number of windings (not shown), is represented by equivalent circuit elements resistor R1 and inductor L1. Resistor R1 represents the internal resistance, and inductor L1 represents the internal inductance of generator 12. The voltage generated by generator 12 is represented as AC voltage source $V_{gen}$.

Three-level rectifier 14 includes a number of passive and active components. Passive components include diodes D1, D2, D3, D4, D5 and D6. Active components include transistor Q1H, Q1L, Q2H, and Q2L (together, "the active components"), wherein transistor Q1H is connected in parallel across diode D1, transistor Q1L is connected in parallel across diode D3, transistor Q2H is connected in parallel across diode D5 and transistor Q2L is connected in parallel across diode D6. Transistor Q1H and diode D1 are connected in series with transistor Q2H and diode D5. Transistor Q1L and diode D3 are connected in series with transistor Q2L and diode D6. The base of each transistor (Q1H, Q2H, Q1L, and Q2L) is connected to receive input from controller 16, such that controller 16 can selectively switch the active components on or off.

By selectively turning the active components on or off, $5^{th}$ and $7^{th}$ harmonics normally generated by the passive diode components within converter 14 can be minimized. Furthermore, control of the active components allows controller 16 to dictate the voltage magnitude and phase of input voltage $V_{in}$ at input node 18 (i.e., control of the fundamental frequency magnitude and phase). Controlling the magnitude and phase of input voltage $V_{in}$ allows controller 16 to increase or decrease the output voltages Va, Vb, and Vc at output nodes 20a, 20b and 20c, respectively. For instance, to increase output voltage Va, the voltage difference between generator voltage $V_{gen}$ and input voltage $V_{in}$ at node 18 is increased (by selecting a desired magnitude and phase of input voltage $V_{in}$) such that current through inductor L1 is increased. By increasing the current through inductor L1, an increased amount of current is provided to output terminals, resulting in an increase in output voltages. Therefore, by controlling the magnitude and phase of input voltage $V_{in}$ at node 18, the DC output voltage Va, Vb, and Vc can be controlled. Likewise, if converter 14 were used as an inverter, the selective control of the active components allows the magnitude and phase of the fundamental frequency at node 18 to be controlled, in what would be the output of the inverter.

By controlling the phase of the input voltage at node 18, controller 16 can control the power factor associated with converter 14. By selectively lagging or leading the input voltage $V_{in}$ with respect to the input current at terminal 18, a desired power factor can be achieved (e.g., if input voltage and input current are in phase, then a maximum power factor of unity is achieved).

In order to make determinations regarding the proper input voltage magnitude and phase to generate at input terminal 18 (depending on whether the DC output voltage Va, Vc, and Vc should be increased or decreased and the desired power factor), controller 16 monitors input current and phase at input node 18, and DC voltage magnitudes Va, Vb, and Vc at output terminals 20a, 20b, and 20c. Furthermore, controller 16 monitors generator voltage $V_{gen}$ magnitude and phase, either by directly sensing the position of generator 12 or by calculating it based on current magnitude and phase sensed at input node 18. For instance, if output voltage Va decreases from a desired magnitude of 3250 volts to 3000 volts, then controller 16 selects a magnitude and phase of input voltage $V_{in}$ with respect to generator voltage $V_{gen}$ such that output voltage Va is increased.

Figure 4:
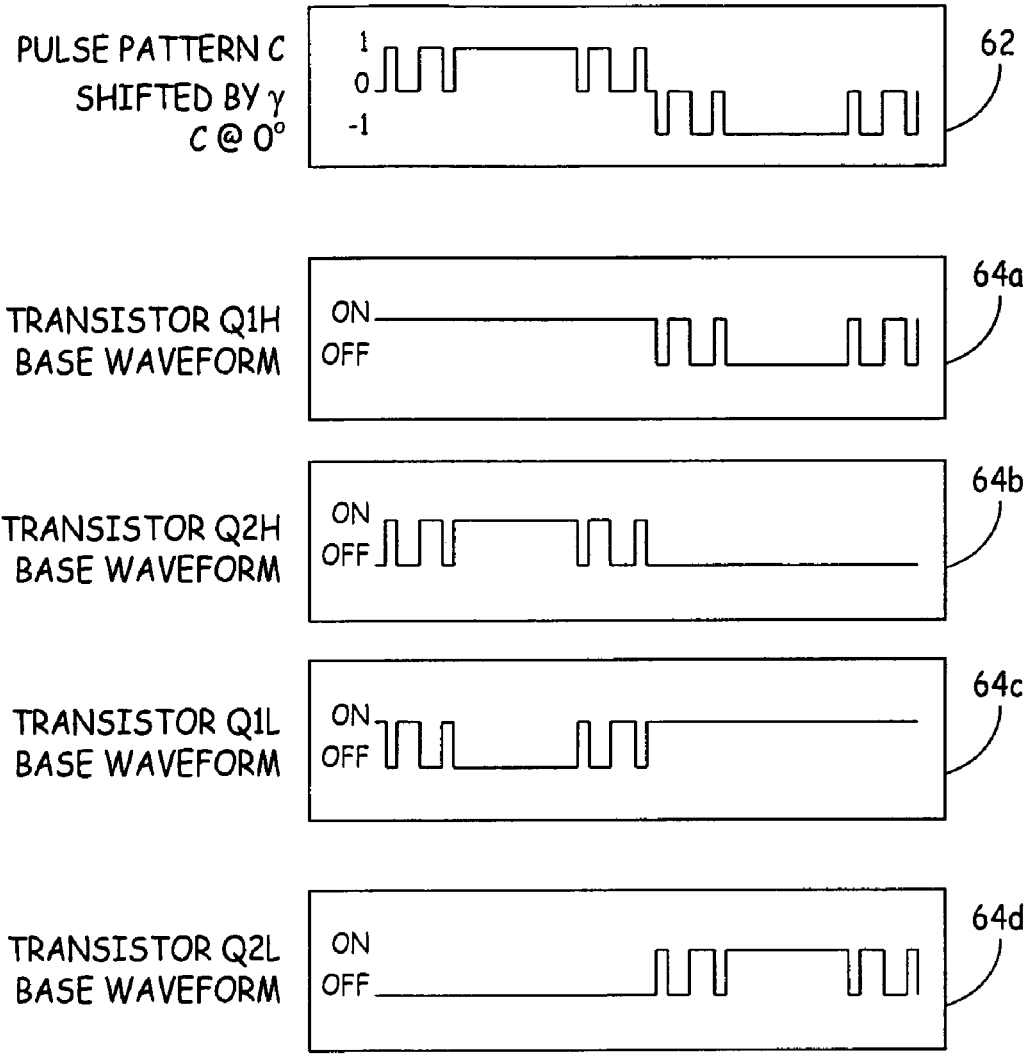
FIG. 4 is a series of charts illustrating voltage patterns applied to switching components within the three-level converter of the present invention.

In order to control the voltage magnitude and phase of input voltage $V_{in}$, controller 16 must calculate the proper voltage waveforms to apply to each of the active components within converter 14 (shown in FIG. 4). The steps shown in FIG. 2 outline the process of calculating the proper voltage waveforms. At step 28, controller 16 monitors necessary input and output voltages. This includes determining voltage magnitude and phase of generator voltage $V_{gen}$, current magnitude and phase generated at input terminal 18, and output voltages Va, Vb, and Vc provided at terminals 20a, 20b, and 20c. At step 30, based on the monitored output voltage Va, Vb, and Vc, controller 16 determines the appropriate magnitude and phase of input voltage $V_{in}$ required to produce the desired output voltages Va, Vb, and Vc. For example, as discussed above, assume DC output voltage Va is supposed to be maintained at 3250 volts. If controller 16 determines that DC output voltage Va has decreased to less than 3250 volts, then it determines the magnitude and phase of input voltage $V_{in}$ that will result in an increase in output voltage Va. In particular, controller 16 determines based on generator voltage $V_{gen}$ the input voltage $V_{in}$ that will result in an increase in current through inductor L1. An increase in (positive) current through inductor L1 results in an increase in DC output voltage Va. At step 31 controller 16 retrieves a first pattern of pulses and a second pattern of pulses known to reduce harmonic distortion. The first pattern of pulses and the second pattern of pulses are essentially voltage waveforms known to reduce $5^{th}$ and $7^{th}$ level harmonics with the minimal number of switching events required. If reduction of the desired harmonics remains the same, the first pattern of pulses and the second pattern of pulses used by controller 16 to control the fundamental voltage magnitude and phase remain the same. That is, controller 16 does not have to calculate the first pattern of pulses or the second pattern of pulses, they remain the same, or fixed. Furthermore, the first pattern of pulses and the second pattern of pulses are identical but for the fact that the second pattern of pulses is shifted in phase by 180° with respect to the first pattern or pulses.

At step 32, the controller uses vector analysis to determine the angle (or phase) difference to apply between the first pattern of pulses and the second pattern of pulses such that vector addition of the first and second set of pulses results in a third pattern of pulses having a magnitude equal to the desired magnitude of input voltage $V_{in}$. This analysis is shown in detail with respect to FIG. 3. At step 34, the second pattern of pulses is phase shifted by the angle or phase determined by the controller in step 32. At step 36, the first pattern of pulses and the phase shifted second pattern of pulses are added to generate a third pattern of pulses. At step 38, the controller determines the amount of phase shift to apply to the third pattern of pulses to effectuate the desired phase in input voltage $V_{in}$. At step 40, voltage patterns are applied to active components within converter 14 based on the phase shifted third pattern of pulses. Application of the voltage patterns has the result of generating input voltage $V_{in}$ at input terminal 18 with the desired phase and magnitude, such that DC output voltages Va, Vb, and Vc are maintained at the desired levels.

Figure 2:
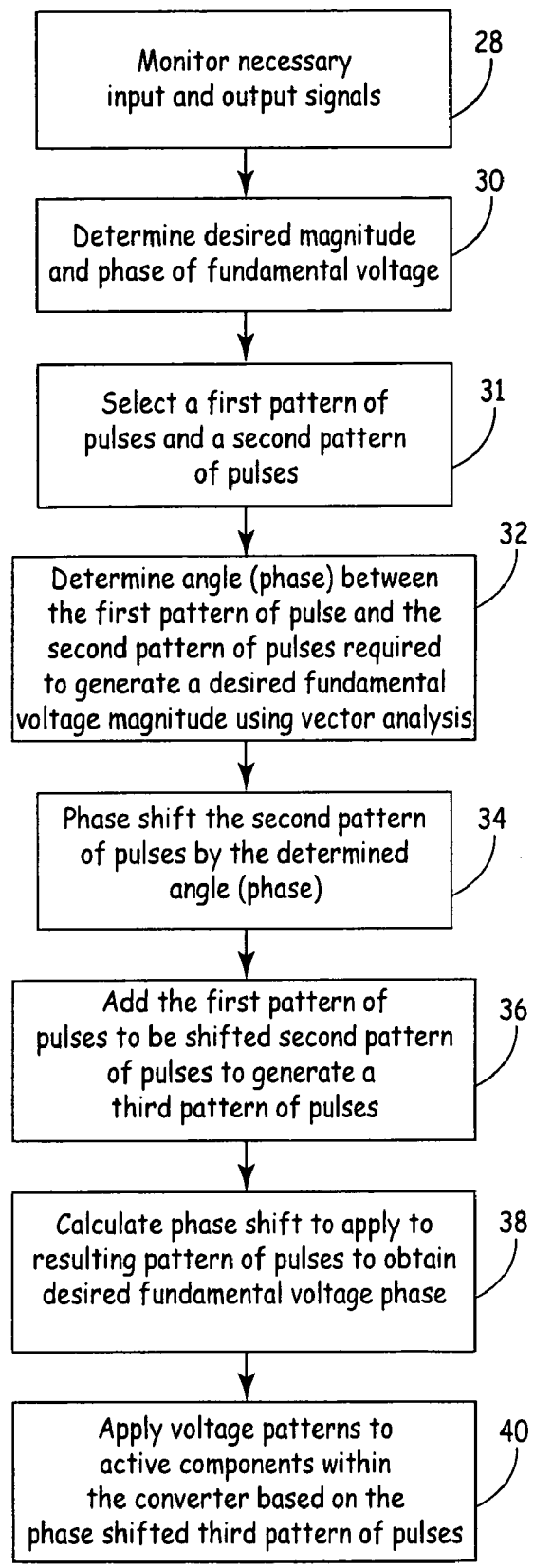
FIG. 2 is a flowchart illustrating the process of selecting voltage patterns to apply to active components within the multi-level converter of the present invention.
Figure 3:
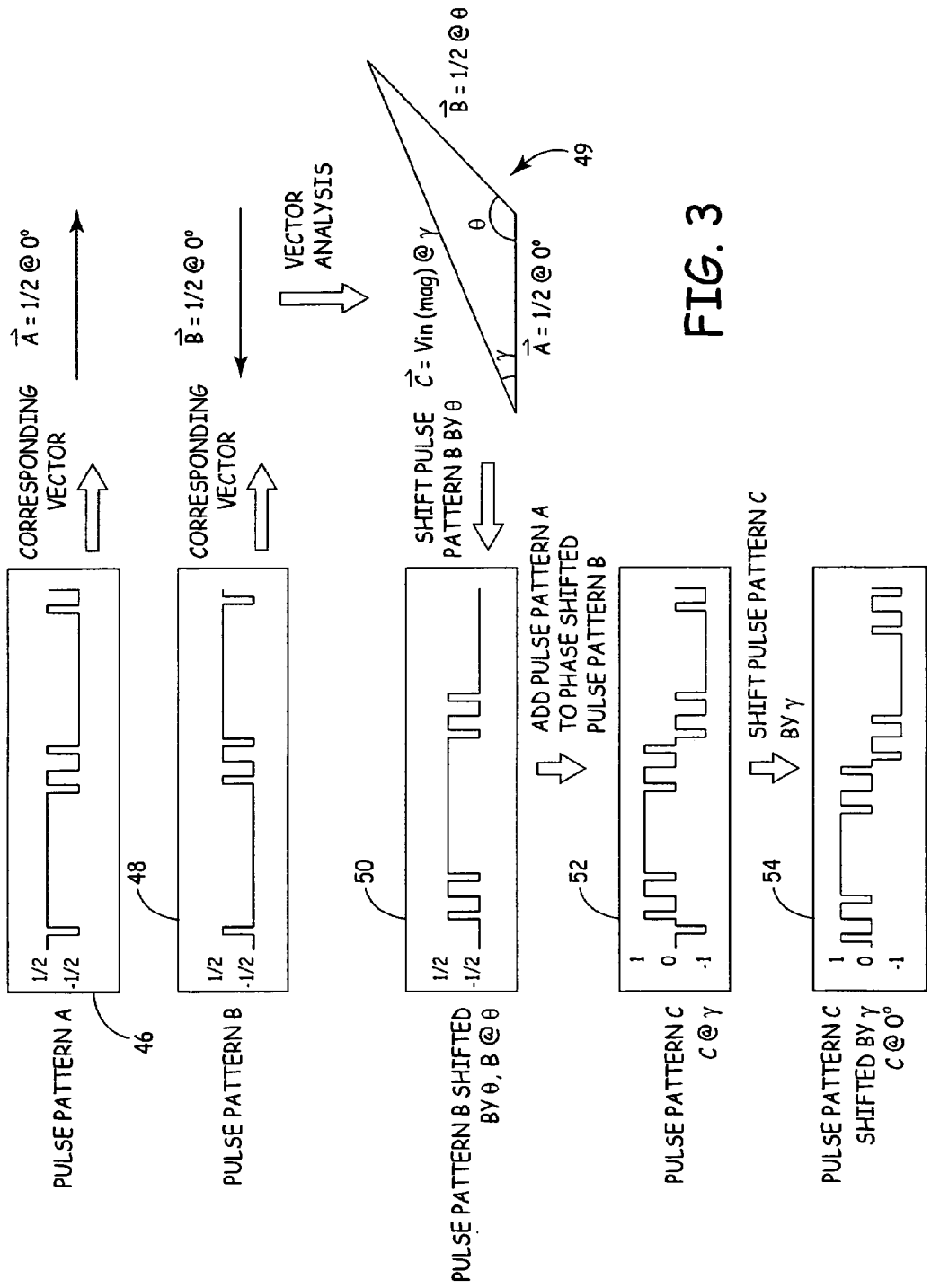
FIG. 3 is a graphical representation of calculations performed to generate a resulting pattern of pulses in a method of the present invention, wherein voltage patterns based on the resulting pattern of pulses is delivered to the multi-level converter to minimize harmonics and facilitate voltage control.

FIG. 3 illustrates graphically calculations performed by controller 16 in generating a pattern of pulses to be applied to active components (e.g., transistors Q1H, Q1L, Q2H, and Q2L shown in FIG. 2). In actuality, controller 16 will perform the necessary calculations without relying on graphical analysis, but for purposes of describing the root of the calculations performed, the graphical analysis is helpful. In particular, FIG. 3 illustrates how a first pulse pattern is combined with a second pulse pattern using vector analysis, such that a resulting pulse pattern, when applied to the active components within converter 14, will provide the desired input voltage magnitude and phase at input node 18. This analysis assumes that controller 16, based on monitored input and output signals, has determined the proper input voltage magnitude and phase at input node 18 that is required to generate the desired DC output voltage.

Controller 16 begins with two initial patterns of pulses known in the prior art to minimize harmonics, pulse pattern A shown in waveform chart 46 and pulse pattern B shown in waveform chart 48. As stated above and known in the prior art, five switching events are required to minimize $5^{th}$ and $7^{th}$ level harmonics. Although with only five switching events, voltage control of input voltage $V_{in}$ is not possible. As shown in FIG. 3, pulse patterns A and B both include 5 switching events, therefore, pulse patterns A and B minimize $5^{th}$ and $7^{th}$ level harmonics, but alone are not capable of providing input voltage control. Pulse pattern B is identical to pulse pattern A, except that pulse pattern B is shifted to be 180° out of phase with respect to pulse pattern A, resulting in pulse pattern B being the precise inverse of pulse pattern A. The magnitudes of pulse patterns A and B are selected to be ½ and –½ to simplify the vector analysis, but have no significance beyond simplifying the description of calculations performed by controller 16.

Pulse patterns A and B can be described as vectors, as shown to the right of each pulse pattern, respectively. Vector A, representing pulse pattern A, has a magnitude of ½ at an angle of 0° and points to the right. Likewise, vector B, representing pulse pattern B, has a magnitude of ½ at an angle of 0° and points to the left. Because pulse pattern B is 180° out of phase with pulse pattern A, the direction of vector B points in exactly the opposite direction as vector A. The magnitude of pulse patterns A and B are selected, as stated above, to simplify the vector analysis, and represent the magnitudes of pulse patterns A and B shown in waveform charts 46 and 48, respectively. The angle used to describe vectors A and B indicates the phase shift that is applied to pulse patterns A and B respectively. For instance, if vector B is described as ½ at an angle of 25°, then the direction of vector B is changed by 25°, and pulse pattern B is correspondingly shifted by 25°.

A third pattern of pulses is determined based on vector analysis shown in vector chart 49. The vector analysis determines the amount of phase shift to apply to pulse pattern B such that adding pulse pattern A to phase shifted pulse pattern B results in a pulse pattern C that controls the input voltage $V_{in}$ to a desired magnitude and phase. The vector analysis relies on the fact that vector addition of vector A to vector B results in a vector C that represents the magnitude and phase of input voltage $V_{in}$. For example, if controller 16 determines that input voltage $V_{in}$ should be made equal to 90% of the generator voltage $V_{gen}$, then vector addition of vectors A and B should result in a vector C having a magnitude ($V_{in}$(mag)) equal to 0.9. Therefore, controller 16 must determine the proper angle θ to assign vector B such that vector addition of vectors A and B results in vector C having a magnitude of 0.9. This calculation is performed by solving the following equation.

$$\theta = 2 * \sin^{-1}(\text{magnitude of Vector C}) \quad \text{Equation 1}$$

In the above example, if the desired magnitude of vector C is 0.9 (representing an input voltage $V_{in}$ that is 90% of generator voltage $V_{gen}$) then solving the above equation results in θ equal to 128°. Controller 16 must also take into account that generation of vector C will be at an angle of γ as shown in vector analysis graph 49.

After determining the value of θ, controller 16 shifts pulse pattern B by θ to generate pulse pattern B@θ as shown in waveform chart 50. Pulse pattern A is then added to the phase shifted pulse pattern B to generate resulting pulse pattern C, as shown by waveform chart 52. For instance, pulse pattern A initially (at the left side of waveform chart 46) has a value of ½, while phase shifted pulse pattern B initially has a value of –½. Adding pulse pattern A to phase shifted pulse pattern B results in pulse pattern C having an initial value of 0. When pulse pattern A changes from a value of ½ to a value of –½ (while phase shifted pulse pattern B remains at –½), pulse pattern C changes to a value of –1, and so on.

The resulting pulse pattern C, when converted to voltage patterns shown in FIG. 4 and applied to the active components within converter 14, will generate a desired magnitude in input voltage $V_{in}$. In order to generate the desired phase in input voltage $V_{in}$, the angle at which vector C is calculated (γ) must be taken into account. Therefore, if the desired phase of input voltage $V_{in}$ with respect to generator voltage $V_{gen}$ is 0°, then pulse pattern C must be shifted by an amount equal to γ such that vector C has an angle of 0°, as shown in waveform chart 54. In other examples, the phase of input voltage $V_{in}$ can be set to lead or lag the phase of the input current (to achieve a desired power factor) by selecting an amount to phase shift pulse pattern C. Changing the phase of pulse pattern C does not have an effect on the magnitude of input voltage $V_{in}$ generated by pulse pattern C.

FIG. 4 shows the phase shifted pulse pattern C in waveform graph 62, and the resulting voltage patterns, shown in waveform graphs 64a, 64b, 64c, and 64d, applied by controller 16 to the base of transistors Q1H, Q1L, Q2H, and Q2L, respectively. The voltage patterns for each transistor are defined by the resulting phases shifted pulse pattern C shown in waveform chart 62 (and waveform chart 54 in FIG. 3). When pulse pattern C is equal to '1', then transistors Q1H and Q2H are on and transistors Q1L and Q2L are off. When pulse pattern C is equal to '0', then transistors Q1H and Q1L are on, and transistors Q2H and Q2L are off. When pulse pattern C is equal to '−1', then transistors Q1L and Q2L are on, and transistors Q1H and Q2H are off. As shown, the on/off periods for transistors Q1H and Q1L are mutually exclusive, resulting in transistor Q1H being on only when transistor Q1L is off, and vice versa. The same is true for transistors Q2H and Q2L, transistor Q2H is only on when transistor Q2L is off, and vice versa. For instance, initially pulse pattern C has a value of '0', resulting in transistors Q1H and Q1L being on, and transistors Q2H and Q2L being off. When pulse pattern C changes to a value of '1', then transistor Q2H is turned on and transistor Q1L is turned off (transistors Q1H and Q2L remain unchanged).

Application of the voltage patterns shown in graphs 64a-64d, per the example discussed with respect to FIG. 3, results in an input voltage $V_{in}$ with a magnitude set at 90% of the maximum voltage available (based on the DC link voltage magnitude at that instant), and at a phase (0°) that is equal to the phase of the generator voltage $V_{gen}$. To change the magnitude of input voltage $V_{in}$ at input node 18, the angle between pulse pattern A (vector A) and pulse pattern B (vector B) has to be changed. Changing the magnitude of the input voltage at input node 18 allows the current through inductor L1 (shown in FIG. 1) to be controlled, such that the DC output voltages Va, Vb, and Vc can be controlled by selectively increasing or decreasing the inductor current. To change the phase of the input voltage at input node 18, the phase shift applied to resulting pulse pattern C has to be changed, taking into account the angle γ that results from combining pulse pattern A and pulse pattern B. Controlling the phase shift allows controller 16 to control the power factor associated with converter 14.

A three-level converter and controller having harmonic minimization and voltage control capabilities has been described in which the controller combines a first pattern of pulses and second pattern of pulses phase shifted by a determined amount to generate a third pattern of pulses to be provided to active switches within the rectifier. Applying the third pattern of pulses reduces harmonic distortion in the generator, and allows the controller to control the input voltage magnitude and phase at an input/output node (depending on the direction of power flow) in real time. In other embodiments, the rectifier may include more than three layers, allowing the rectifier to be used in even higher power applications while still providing output voltage control and harmonic minimization. In other embodiments, the switching devices may include (IGBT, MOSFET, GTO, or MCT devices). Furthermore, other embodiments include connecting several of the three-level converters in parallel such that multi-phase current can be accommodated.

The invention claimed is:

1. A method of controlling a fundamental voltage associated with an active multi-level converter, the method comprising:
   determining a desired fundamental voltage magnitude to be generated at an alternating current (AC) input terminal of the active multi-level converter;
   combining a first fixed pattern of pulses with a second fixed pattern of pulses based on the desired fundamental voltage magnitude to generate a third pattern of pulses;
   determining switching control waveforms to be applied to each active component within the active multi-level converter based on the third pattern of pulses; and
   applying the determined switching control waveforms to each of the active components within the active multi-level converter, wherein the switching control waveforms selectively switch each of the active components within the active multi-level converter between a conducting state and a non-conducting state, resulting in the desired fundamental voltage magnitude being generated at the AC input terminal of the active multi-level converter.

2. The method of claim 1, wherein combining a first fixed pattern of pulses with a second fixed pattern of pulses includes:
   selecting the first fixed pattern of pulses and the second fixed pattern of pulses based on desired harmonic levels to be reduced, such that the third pattern of pulses provide harmonic minimization of the desired harmonic levels when the determined switching control waveforms are applied to the active components within the active multi-level converter.

3. The method of claim 1, wherein determining a desired fundamental voltage magnitude includes:
   measuring direct current (DC) voltage provided at DC terminals of the active multi-level converter; and
   determining the desired fundamental voltage magnitude based on the measured DC voltage provided at the DC terminals.

4. The method of claim 3, wherein determining the desired fundamental voltage magnitude includes:
   monitoring AC voltage magnitude at an AC device terminal, wherein the AC device terminal is separated from the AC input terminal of the active multi-level converter by an inductive element; and
   measuring AC current magnitude and phase at the AC input terminal of the active multi-level converter;
   selecting a desired DC voltage to be provided at the DC terminals;
   determining the AC current magnitude required to selectively increase or decrease the measured DC voltage such that the desired DC voltage is provided at the DC terminal of the active multi-level converter; and
   determining the desired fundamental voltage magnitude required to generate the required AC current magnitude based on the monitored AC voltage magnitude at the AC device terminal.

5. The method of claim 1, wherein combining the first pattern of pulses with the second pattern of pulses includes:
   determining a first amount of phase shift to apply to the second pattern of pulses based on the desired fundamental voltage magnitude; and
   combining the first pattern of pulses with the phase shifted second pattern of pulses to create the third pattern of pulses.

6. The method of claim 1, further including:
   determining a desired fundamental voltage phase to be provided at the AC input terminal of the active multi-level converter.

7. The method of claim 6, further including:
   determining a second amount of phase shift to apply to the third pattern of pulses based on the desired fundamental voltage phase to be provided at the AC input terminal of the active multi-level converter; and
   shifting the third pattern of pulses by the second amount of phase shift.

8. The method of claim 6, wherein determining the desired fundamental voltage phase includes:
   measuring fundamental current magnitude and phase provided to the active multi-level converter; and
   selecting the fundamental voltage phase based on the measured magnitude and phase of the fundamental current provided to the active multi-level converter.

9. The method of claim 1, wherein the first fixed pattern of pulses and the second fixed pattern of pulses have identical waveforms, with the second pattern of pulses initially being at a different phase than the first pattern of pulses.

10. A system for providing fundamental voltage control of an active multi-level converter, the system comprising:

an active multi-level converter having both active and passive components, wherein the active multi-level converter is connected to direct current (DC) terminals and an alternating current (AC) terminal, wherein the AC terminal provides the fundamental voltage;

an AC device connected to the active multi-level converter, wherein the AC device provides or receives AC power from the active multi-level converter;

a controller connected to monitor the DC terminals and the AC terminal of the active multi-level converter and the AC device, and to provide control signals to the active components within the converter, wherein the controller selects a desired fundamental voltage magnitude and phase based on the monitored DC terminals and AC terminal of the active multi-level converter and the AC device, and combines a first fixed pattern of pulses with a second fixed pattern of pulses based on the desired fundamental voltage magnitude to generate a third pattern of pulses, wherein the controller delivers control signals to the active components within the active multi-level converter based on the third pattern of pulses.

11. The system of claim 10, wherein the controller selects the first fixed pattern of pulses and the second fixed pattern of pulses based on desired harmonic levels to be minimized, such that the third pattern of pulses generated by the controller minimizes the desired harmonics.

12. The system of claim 10, wherein the AC device is an AC generator comprising:

an AC generator voltage terminal; and a resistive element and an inductive element representing the resistance and inductance present in the AC generator, wherein the AC generator voltage terminal is separated from the AC fundamental voltage terminal by the resistive and inductive elements.

13. The system of claim 12, wherein the controller monitors AC voltage at the AC generator voltage terminal, and wherein the controller selects the desired fundamental voltage magnitude based on the DC voltage monitored at the DC terminals and the AC voltage monitored at the AC generator voltage terminal such that a desired current at the AC terminal of the active multi-level converter is created.

14. A method of controlling direct current (DC) output voltage generated by an active rectifier, the method comprising:

monitoring DC output voltages generated by the active rectifier at output terminals;

determining AC generator voltage magnitude and phase generated within the generator;

monitoring AC current magnitude and phase provided to the active rectifier at the input terminal;

selecting a desired fundamental voltage magnitude and phase to generate at an input terminal of the active rectifier based on the monitored DC output voltages at the output terminals, AC current magnitude at the input terminal, and determined AC generator voltage within the generator such that the DC output voltages are maintained at a desired DC level, combining a first fixed pattern of pulses with a second fixed pattern of pulses based on the desired fundamental voltage magnitude to generate a third pattern of pulses; and delivering switch control waveforms to active components within the active rectifier based on the third pattern of pulses.

15. The method of claim 14, wherein combining the first fixed pattern of pulses with the second fixed pattern of pulses includes:

selecting the first pattern of pulses and the second pattern of pulses based on desired harmonic levels to be minimized, wherein the third pattern of pulses generated by combining the first pattern of pulses with the second pattern of pulses provides minimization of the desired harmonic levels.

16. The method of claim 14, wherein combining the first pattern of pulses with the second pattern of pulses includes:

determining a first amount of phase shift to apply to the second pattern of pulses based on the desired fundamental voltage magnitude; and combining the first pattern of pulses with the phase shifted second pattern of pulses to create the third pattern of pulses.

17. The method of claim 14, further including:

applying a phase shift to the third pattern of pulses based on the desired fundamental voltage phase.

18. The method of claim 14, wherein the first pattern of pulses and the second pattern of pulses have identical waveforms, with the second pattern of pulses initially being at a different phase than the first pattern of pulses.

* * * * *